(12) United States Patent
Lacarte (10) Patent No.: US 10,596,584 B2
(45) Date of Patent: Mar. 24, 2020

(54) SLIP MOLDING APPARATUS FOR LINING PIPES AND METHOD OF USING SAME

(71) Applicant: BASF SE, Ludwigshafen am Rhein (DE)

(72) Inventor: Chris Lacarte, Rockwood (CA)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/528,947

(22) PCT Filed: Nov. 24, 2015

(86) PCT No.: PCT/IB2015/059105
§ 371 (c)(1),
(2) Date: May 23, 2017

(87) PCT Pub. No.: WO2016/084006
PCT Pub. Date: Jun. 2, 2016

(65) Prior Publication Data
US 2017/0266683 A1 Sep. 21, 2017

Related U.S. Application Data

(60) Provisional application No. 62/085,034, filed on Nov. 26, 2014.

(51) Int. Cl.
*F16L 55/16* (2006.01)
*B05B 13/06* (2006.01)
(Continued)

(52) U.S. Cl.
CPC ............... *B05B 13/06* (2013.01); *B05C 7/08* (2013.01); *B28B 19/0023* (2013.01); *F16L 55/16455* (2013.01); *B28B 19/00* (2013.01)

(58) Field of Classification Search
CPC ............... E03F 2003/065; B05B 13/06; F16L 55/16455; B28B 19/0023; B28B 19/00; B05C 7/08
(Continued)

(56) References Cited

U.S. PATENT DOCUMENTS 2,758,352 A * 8/1956 Perkins ............... B28B 19/0023
425/262
3,333,311 A * 8/1967 Matheny ............. B28B 19/0023
425/262
(Continued)

FOREIGN PATENT DOCUMENTS

DE 42 30 586 A1 3/1994

OTHER PUBLICATIONS

International Search Report for Application No. PCT/IB2015/059105 dated May 2, 2016, 3 pages.
(Continued)

*Primary Examiner* — Benjamin F Fiorello
*Assistant Examiner* — Edwin J Toledo-Duran
(74) *Attorney, Agent, or Firm* — DLA Piper LLP US (57) ABSTRACT

A slip molding apparatus (10) for lining a pipe (12) includes a dispense head (20) adapted to engage an interior surface (14) of a pipe (12) and to dispense a lining material, a slip mold (38) pulled by the dispense head (20) and having a leading end (42) and a trailing end (44), wherein the trailing end (44) has a greater diameter than a diameter of the leading end (42), at least one camera (58) disposed on the dispense head (20) to provide a view of the interior surface (14) of the pipe (12), a guide (46) connected to the dispense head (20) and the slip mold (38) for guiding the lining material dispensed by the dispense head (20) about the slip mold (38), and a movable diverter (52) on the slip mold (38) cooperating with the guide (46) to divert a flow of lining
(Continued)

material dispensed by the dispense head (20) about the slip mold (38).

16 Claims, 5 Drawing Sheets

(51) Int. Cl.
    *F16L 55/1645*     (2006.01)
    *B05C 7/08*     (2006.01)
    *B28B 19/00*     (2006.01)

(58) Field of Classification Search
    USPC ......... 138/97, 98; 118/306; 425/94, 97, 104, 425/113, 208; 405/184.1–184.3
    See application file for complete search history.

(56) References Cited

U.S. PATENT DOCUMENTS

| | | | | |
|---|---|---|---|---|
| 3,655,122 A | * | 4/1972 | Brown | B05B 13/0636 239/226 |
| 3,966,389 A | * | 6/1976 | Shubert | B05C 7/02 425/460 |
| 4,256,445 A | * | 3/1981 | Pingree | B28B 19/0023 425/101 |
| 4,371,569 A | * | 2/1983 | Muta | B05C 7/08 427/230 |
| 4,741,795 A | * | 5/1988 | Grace | B05C 7/02 118/105 |
| 4,950,356 A | * | 8/1990 | Grace | F16L 55/1645 118/105 |
| 5,019,417 A | * | 5/1991 | Northcutt | B05C 3/18 118/105 |
| 5,309,947 A | * | 5/1994 | Hinger | E03F 3/06 118/306 |
| 5,497,807 A | * | 3/1996 | Rogers | F16L 55/1645 138/98 |
| 5,855,676 A | * | 1/1999 | Lu | B05C 7/04 118/105 |
| 2011/0076397 A1 | | 3/2011 | Rauch | |

OTHER PUBLICATIONS

English language abstract and machine-assisted English translation for DE 42 30 586 extracted from espacenet.com database on Jun. 1, 2017, 16 pages.

First Office Action from counterpart Chinese Patent Application No. 201580064556X dated Jan. 21, 2019, and its English translation.

* cited by examiner

SLIP MOLDING APPARATUS FOR LINING PIPES AND METHOD OF USING SAME

CROSS-REFERENCE TO RELATED APPLICATIONS

The present application is the National Stage of International Patent Application No. PCT/IB2015/059105, filed on Nov. 24, 2015, which claims priority to and all the benefits of U.S. Provisional Patent Application No. 62/085,034, filed on Nov. 26, 2014, which is hereby expressly incorporated herein by reference in its entirety.

BACKGROUND OF THE INVENTION

1. Field of the Invention

The present invention relates generally to lining pipes and, more particularly, to a slip molding apparatus for lining a pipe and method of using same.

2. Description of the Related Art

It is known to provide pipes for fluids such as water that are buried in the ground. Over time, these pipes can become cracked or broken, resulting in loss of fluid. Typically, the damaged buried pipe is dug up, removed, and replaced with a new pipe. However, this results in a large amount of labor and cost to replace the pipe.

It is often desirable to line damaged pipes with a material that is resistant to attack by products conveyed through the pipes and/or that provides heat or electrical insulation, or the like. Current lining methods employ fixed forms inserted into the pipes so that concrete or other material that can be chemically or thermally set may be introduced between the interior of the pipes and the forms. After the material has set to produce a solid lining, the forms must be removed. This is a time-consuming operation that is made more difficult if the pipe has a complex geometry.

One known method provides a form for producing a lining in a pipe. The form includes a body having a leading part and a trailing part, a hole in a leading side of the leading part and a channel in the body communicating with the hole. The body has a diameter at the leading part that is greater than the diameter of the trailing part. The channel has at least one peripheral opening situated rearwardly of the leading part of the form at a position to discharge lining material from the channel around the trailing part of the form, and a supply tube, or an attachment on the leading side for the supply tube, for supplying flowable settable lining material to and through the hole.

One disadvantage of the above-described form is that the form allows flow into intersecting pipes such that they are blocked by the lining materials. As a result, a secondary operation is need to clear or open the intersecting pipes. This is labor intensive and costly.

It is, therefore, desirable to provide a slip molding apparatus for lining a pipe that prevent flow into intersecting pipes so that they are not blocked by the lining materials. It is also desirable to provide a method for using the slip molding apparatus to line a pipe with a lining. It is further desirable to provide a simple, rapid and adaptable way of providing pipes with linings of this kind. It is still further desirable to provide a slip molding apparatus that can be used for intersecting pipes. Therefore, there is a need in the art to provide a slip molding apparatus and method of using the same that meets at least one of these desires.

SUMMARY OF THE INVENTION

Accordingly, the present invention provides a slip molding apparatus for lining a pipe. The slip molding apparatus includes a dispense head adapted to engage an interior surface of a pipe and to dispense a lining material, a slip mold pulled by the dispense head and having a leading end and a trailing end, wherein the trailing end has a greater diameter than a diameter of the leading end, at least one camera disposed on the dispense head to provide a view of the interior surface of the pipe, a guide connected to the dispense head and the slip mold for guiding the lining material dispensed by the dispense head about the slip mold, and a movable diverter on the slip mold cooperating with the guide to divert a flow of lining material dispensed by the dispense head about the slip mold.

In addition, the present invention provides a method of using a slip molding apparatus to line a pipe with a lining material. The method includes the steps of disposing a slip molding apparatus including a dispense head and a slip mold within an interior of a pipe and engaging an interior surface of a pipe with the dispense head and dispensing a lining material. The method also includes the steps of pulling a slip mold by the dispense head and having a leading end and a trailing end, wherein the trailing end has a greater diameter than a diameter of the leading end. The method includes the steps of viewing the interior surface of the pipe with at least one camera disposed on the dispense head and guiding the lining material dispensed by the dispense head about the slip mold with a guide connected to the dispense head and the slip mold. The method further includes the steps of diverting a flow of lining material dispensed by the dispense head about the slip mold with a movable diverter on the slip mold cooperating with the guide.

One advantage of the present invention is that a new slip molding apparatus is provided for lining a pipe. Another advantage of the present invention is that the slip molding apparatus has the ability to prevent flow into intersecting pipes so that they are not blocked by the lining materials. Yet another advantage of the present invention is that the slip molding apparatus allows for precise flow rate calculations of the rehabilitated pipe. Still another advantage of the present invention is that the slip molding apparatus has the ability to provide a variety of pipe linings such, but not limited to, concrete, cement, polyurethane, epoxy, etc. A further advantage of the present invention is that the slip molding apparatus has the ability to add reinforcing materials to the lining such as, but not limited to, fiberglass windings or pieces, glass microspheres, mesh, wire, etc. Yet a further advantage of the present invention is that the slip molding apparatus has the ability to apply leak detection wires during application. Still a further advantage of the present invention is that the slip molding apparatus has full contact to the inner core of the pipe that is being rehabilitated.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
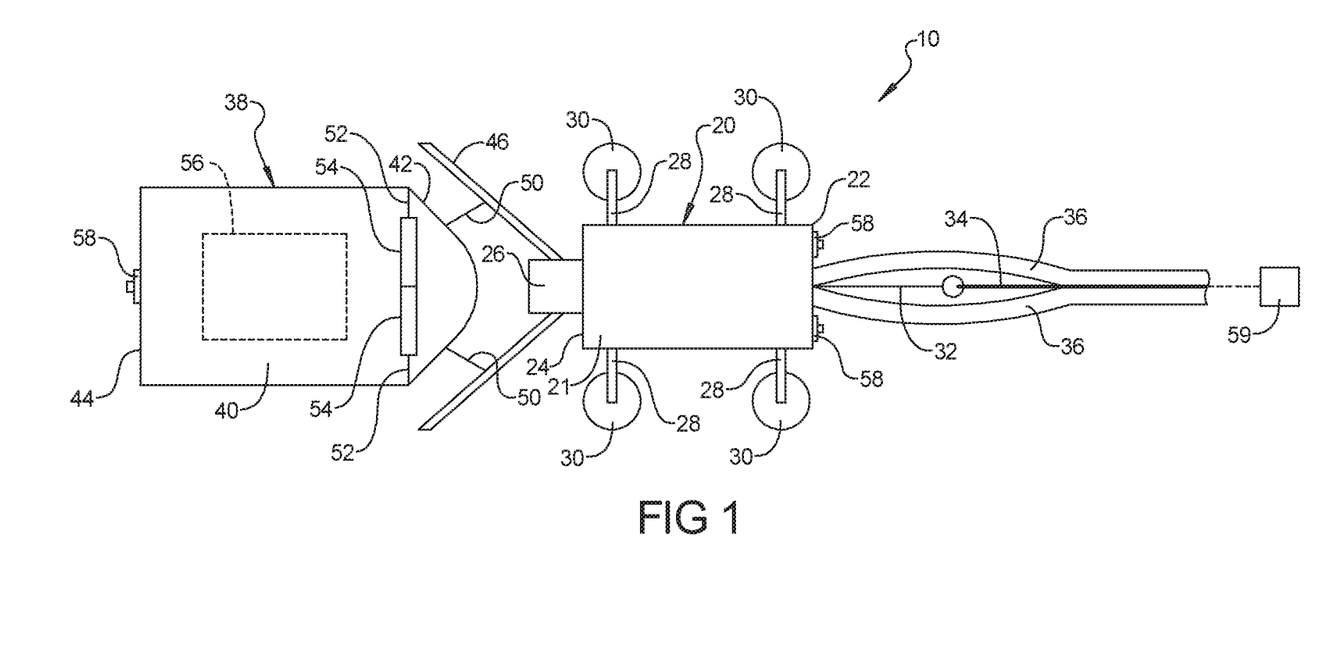
FIG. 1 is an elevational view of one embodiment of a slip molding apparatus, according to the present invention, for lining a pipe.
Figure 2:
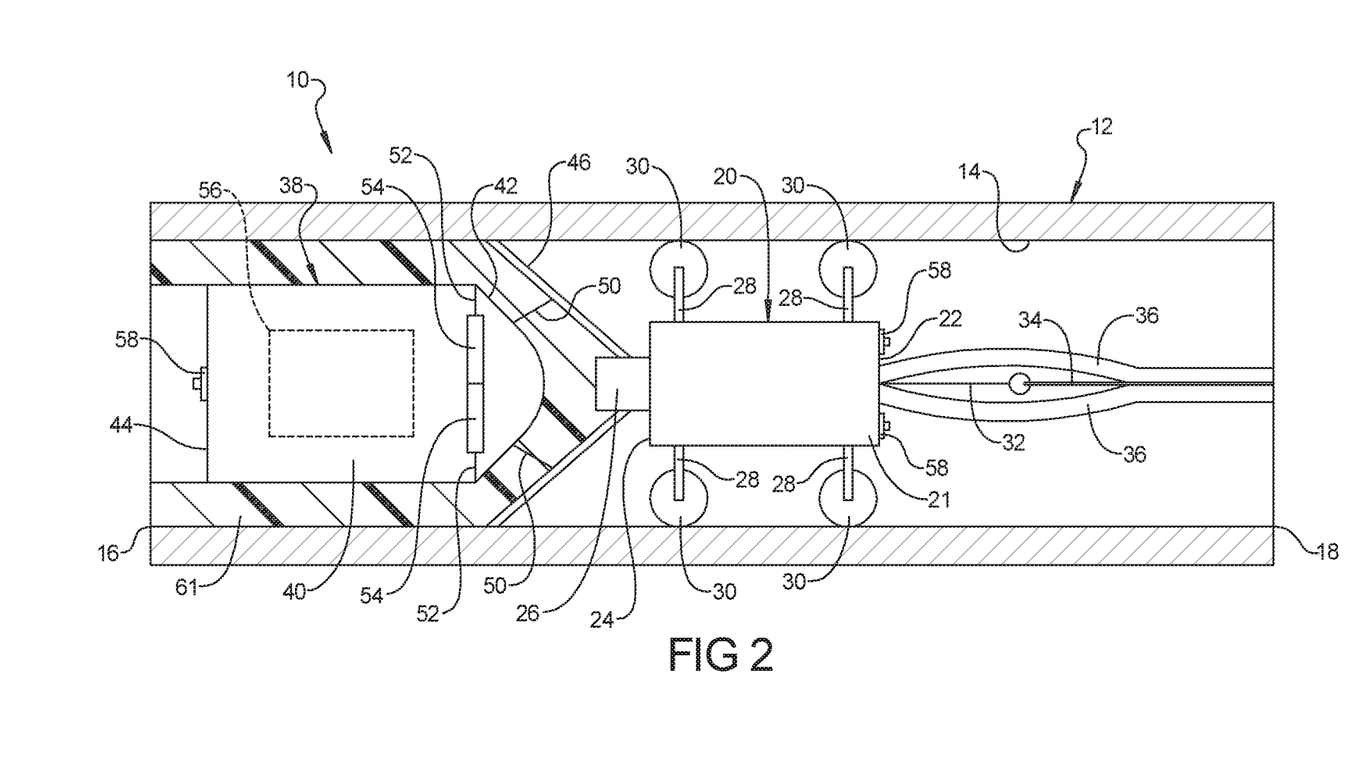
FIG. 2 is a fragmentary elevational view of the slip molding apparatus of FIG. 1 illustrating the slip molding apparatus disposed in a pipe and lining the pipe with a lining material.

Referring to the figures, wherein like numerals indicate like parts throughout the several views, one embodiment of a slip molding apparatus, according to the present invention, is shown generally at 10 in FIGS. 1 and 2. The slip molding apparatus 10 is configured to be disposed in a pipe, generally indicated at 12, in FIG. 2. As illustrated in FIG. 2, the pipe 12 is generally cylindrical in shape and extending axially a predetermined distance. In one embodiment, the pipe 12 has a generally circular cross-sectional shape, but may be any suitable shape. The pipe 12 has an interior surface 14. In the embodiment illustrated, the pipe 12 also has a first open end 16 and a second open end 18 spaced axially from the first open end 16. The pipe 12 is made of a material such as metal, plastic, concrete, or the like for conveying a fluid such as water, oil, gas, etc. It should be appreciated that the pipe 12 illustrated in FIG. 2 is known in the art and is commercially available. It should also be appreciated that the pipe 12 illustrated in FIG. 2 is not intended to limit the scope of the present invention. It should further be appreciated that the slip molding apparatus 10 may be used with various other types of pipes, not specifically shown herein, without departing from the scope of the present invention.

Referring to FIGS. 1 and 2, the slip molding apparatus 10 includes a dispense head, generally indicated at 20, for engaging the interior surface 14 of the pipe 12. The dispense head 20 has a body 21 that is generally cylindrical in shape. In one embodiment, the body 21 is generally circular in cross-sectional shape, but may be any suitable shape. The body 21 has a first or forward end 22 and a second or rearward end 24 spaced axially from the forward end 22. It should be appreciated that the body 21 may have a hollow interior (not shown) for receiving a lining material for lining the pipe 12, a control valve (not shown) to control flow of the lining material, or a mixing head (not shown) for the lining material. It should also be appreciated that the body 12 may include a hydraulic or pneumatic piston (not shown) that pulls a rod (not shown) back, allowing multiple chemicals for the lining material to pass through orifices (not shown), at high pressure (approximately 1000 to 2,500 psi) that atomize the chemicals and enter a mixing chamber (not shown) to mix and be directed out from the dispense head 20.

The dispense head 20 also has a nozzle 26 extending axially from the rearward end 24 of the body 21 to dispense the material for lining the interior surface 14 of the pipe 12. The dispense head 20 also includes one or more arms 28 extending radially from the body 21 and one or more rotatable rollers 30 mounted to the arms 28 for allowing the body 21 to be centered within and roll along the interior surface 14 of the pipe 12. In the embodiment illustrated, the dispense head 20 includes four arms 28 and four rollers 30 with one roller 30 being mounted to one arm 28. The arms 28 may be spaced axially and/or circumferentially along the body 21. It should be appreciated that the body 21 rolls along the interior surface 14 of the pipe 12.

The dispense head 20 further includes an attachment 32 extending axially from the forward end 22 of the body 21 to allow attachment to a retracting cable 34 or the like to allow the dispense head 20 to be pulled along the interior surface 14 of the pipe 12. In one embodiment, the attachment 32 may be of an eyelet type. The dispense head 20 also includes one or more chemical hoses 36 connected to the body 21 to supply the lining material to the dispense head 20. It should be appreciated that the chemical hoses 36 may be attached to the retracting cable 34 to allow the retracting cable 34 and chemical hoses 36 to be pulled together as a unit. It should also be appreciated that the chemical hoses 36 supply the chemicals for lining material to the body 21, which is dispensed from the nozzle 26 of the dispense head 20.

The slip molding apparatus 10 further includes a slip mold, generally indicated at 38, to form the lining material on the interior surface 14 of the pipe 12. The slip mold 38 includes a body 40 having a generally cylindrical shape. In one embodiment, the body 40 has a generally circular cross-sectional shape, but may be any suitable shape. The body 40 has a first or leading end 42 and a second or trailing end 44 spaced axially from the forward end 42. The forward end 42 is generally arcuate in shape to allow the lining material to flow over the body 40. The trailing end 44 has a diameter greater than a diameter of the leading end 42. In one embodiment, the body 40 may be solid. It should be appreciated that the body 40 is used for forming the lining material. It should also be appreciated that the final internal diameter of the lining would be the diameter of the body 40 for the slip mold 38 used in the pipe 12. It should further be appreciated that different diameter bodies 40 may be used for the slip mold 38 to vary the thickness of the lining for the pipe 12.

The slip mold 38 also includes a guide 46 for guiding the lining material dispensed by the dispense head 20 about the body 40. In one embodiment, the diverter 46 has a generally inverted "V" shape. The guide 46 has a narrow or pointed end disposed about the nozzle 26 of the dispense head 20. The guide 46 may be connected to the nozzle 26 by a suitable mechanism such as fasteners (not shown), welding, or the like. The guide 46 has a wide or open end 48 that engages the interior surface 14 of the pipe 12. The guide 46 is supported on the body 40 by a suitable mechanism such as one or more braces 50. It should be appreciated that the braces 50 may be connected to the body 40 by a suitable mechanism such as fasteners (not shown), welding, or the like. It should also be appreciated that the slip mold 38 is pulled by the dispense head 20.

The slip molding apparatus 10 includes one or more diverters 52 on the slip mold 38 and cooperating with the guide 46 to divert a flow of the lining material dispensed by the dispense head 20 about the slip mold 38. The diverters 52 are movable plates connected to the body 40 of the slip mold 38. In one embodiment, the diverters 52 are operatively connected to an actuator 54 such as, for example, a solenoid having a piston that is extended or retracted. It should be appreciated that the actuator 54 pushes one or more of the diverter plates 52 into the lining material and cooperates with the guide 46 to block the flow of the lining material about a side of the body 40.

The slip molding apparatus 10 may include a heater 56 attached to the slip mold 38. In one embodiment, the heater 56 is a heating element disposed within the body 40 of the slip mold 38. It should be appreciated that the heater 56 may be connected by wires (not shown) to the braces 50 and retracting cable 34.

The slip molding apparatus 10 further includes one or more cameras 58 disposed on the dispense head 20 and slip mold 38 to provide a view of the interior surface 40 of the pipe 12. In one embodiment, a pair of cameras 58 are mounted to the forward end of the body 21 of the dispense head 20 and one camera 58 is mounted to the rearward end of the body 40 of the slip mold 38. The slip molding apparatus 10 also includes a remote controller 59 communicating with the cameras 58 for view by an operator. It should also be appreciated that the cameras 58 are connected by wires (not shown) to the retracting cable 34 and viewed by the operator remotely.

The lining material could be a variety of materials such as concrete, cement, polyurethane, epoxy, or any polymer, such as one of the following classes of thermoplastic or thermoset polymers: any member from the group of polyesters, polyamide, polyethylene, polyethylene terephthalate, acrylonitrile, butadiene styrene, polymethyl methacrylate, cellulose acetate, cyclic olefin copolymers, fluoropolymers, polyoxymethylene, polyacrylates, polyacrylonitrile, polyaryletherketone, polyamide-imide, polybutylene terephthalate, polyurethanes, polyketone, polyetheretherketone, polyetherimide, polycarbonate, polymethylpentene, polyphenylene sulfide, polyphenylene oxide, polyphthalamide, polystyrene, polysulfone, polyvinyl chloride, and styrene-acrylonitrile, and any combinations thereof. An example of a suitable lining material for the present invention is commercially available from BASF Corporation, 100 Campus Drive, Florham Park, N.J.

In one embodiment, the lining material includes reinforcing materials. Although not required, the reinforcing materials include, but are not limited to, fiberglass windings or pieces, glass microspheres, mesh, wire, etc. An example of a suitable reinforcing material for the present invention is commercially available from BASF Corporation, 100 Campus Drive, Florham Park, N.J.

In operation, the slip molding apparatus 10 is disposed in the pipe 12 that is being rehabilitated. As illustrated in FIG. 2, the dispense head 20 and slip mold 38 are placed into the open end 16 of pipe 12. The lining material is dispensed through the chemical hoses 36, the dispense head 20, and out the nozzle 26. The operator moves the retracting cable 34 toward the other open end 18 of the pipe 12 to pull the dispense head 20. The dispense head 20 pulls the slip mold 38. The dispensed lining material is guided around the slip mold 38 by the guide 46 as the slip molding apparatus 10 is retracted or pulled along the pipe 12 by the retracting cable 34 and forms a lining 61 on the interior surface 14 of the pipe 12. The lining material is formulated such that it will cure while the slip mold 38 slips through the lining material, thereby forming the lining 61. The camera 58 on the slip mold 38 can be used by the operator to ensure complete coverage of the lining 61 on the interior surface 14 of the pipe 12. The rate of cure can be aided by the heater 56 to the slip mold 38. It should be appreciated that the flow rate of the lining material is controlled by the rate of retracting the slip molding apparatus 10.

Figure 3:
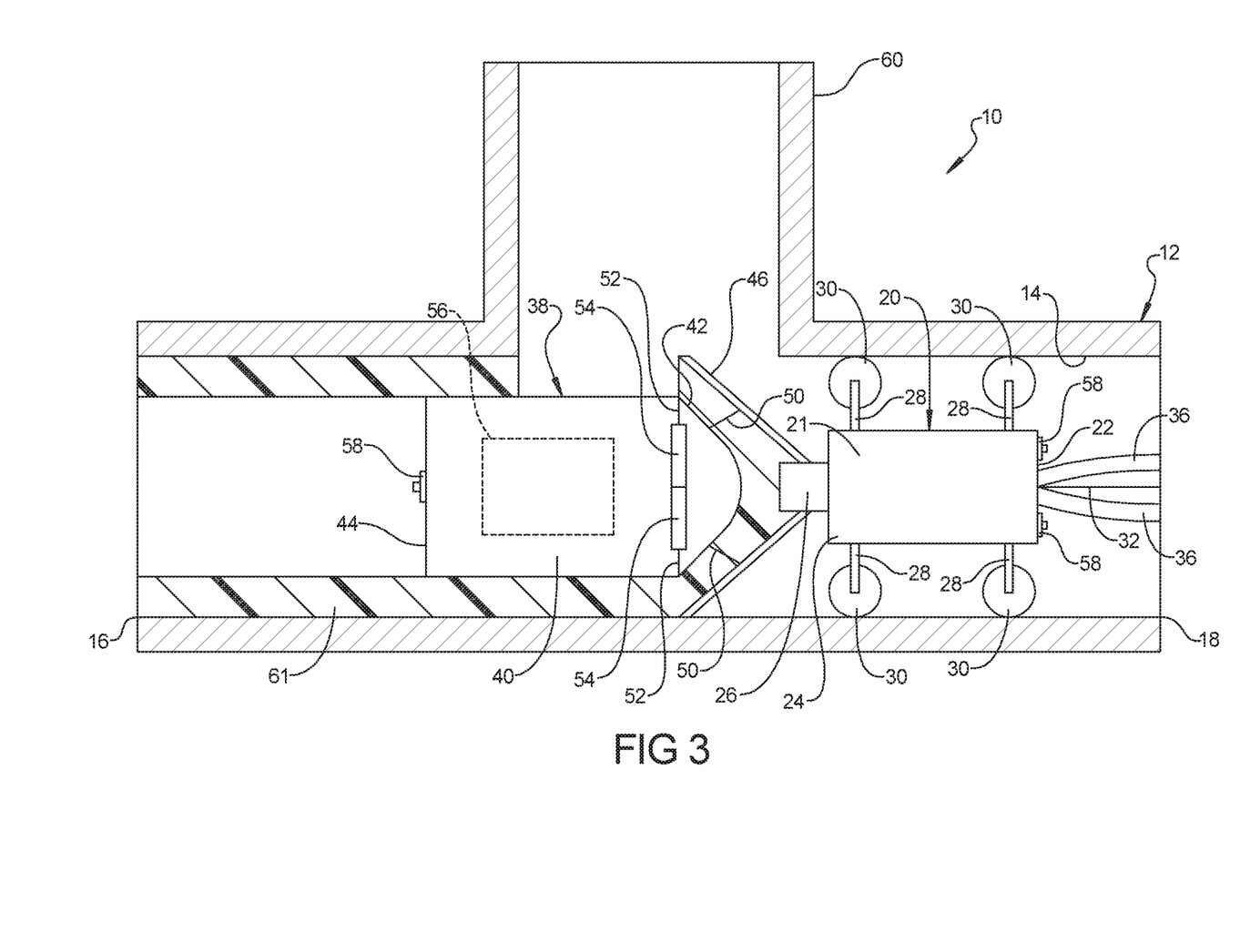
FIG. 3 is a view similar to FIG. 2 illustrating the slip molding apparatus lining the pipe with an intersecting pipe forming a T intersection.

As illustrated in FIG. 3, when the slip molding apparatus 10 encounters an intersecting pipe 60, as viewed by the cameras 58 on the dispense head 20, the operator can activate the actuator 54 and push the diverter 52 into the lining material, thereby blocking the lining material from entering the intersecting pipe 60. Once the dispense head 20 is past the intersecting pipe 60, the operator can activate the actuator 54 and pull or retract the diverter 52 and continue to line the full pipe 12 with the lining 61. It should be appreciated that the amount of time the piston of the actuator 54 stays activated is controlled by the rate of the movement of the slip molding apparatus 10.

Figure 4:
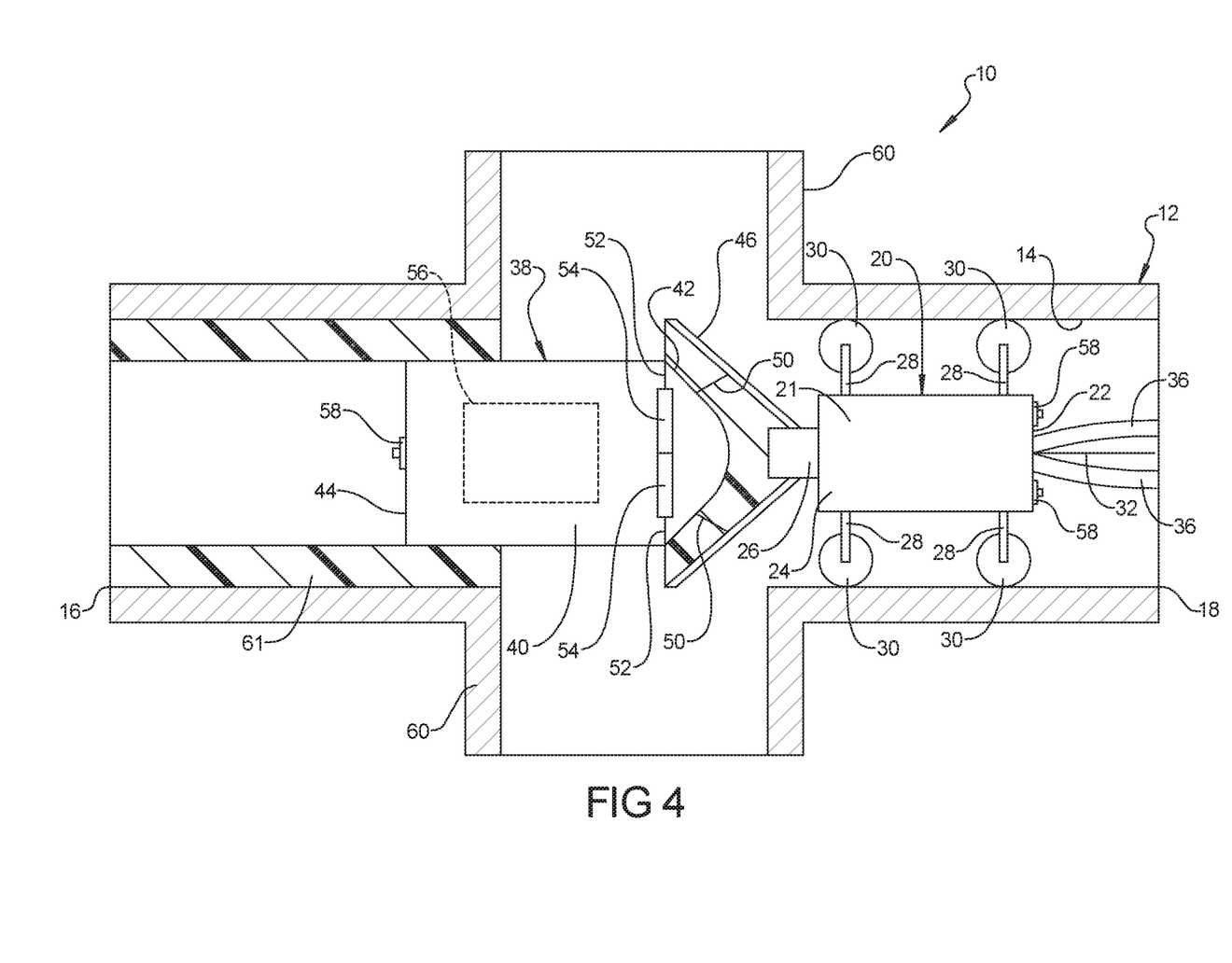
FIG. 4 is a view similar to FIG. 2 illustrating the slip molding apparatus lining the pipe with intersecting pipes forming a + or four-way intersection.
Figure 5:
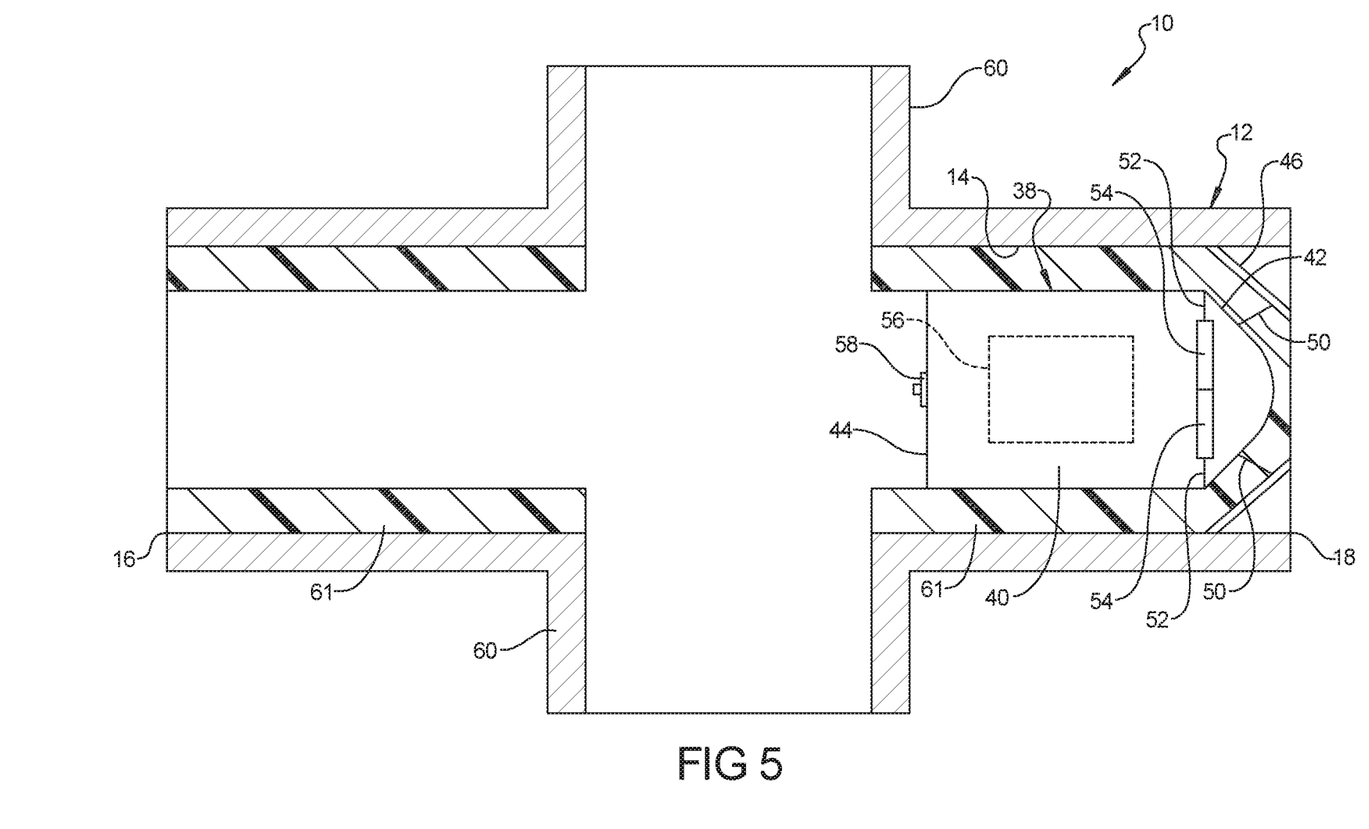
FIG. 5 is another view similar to FIG. 4 illustrating the slip molding apparatus lining the pipe with intersecting pipes forming a + or four-way intersection.

As illustrated in FIG. 4, when the slip molding apparatus 10 encounters two opposed intersecting pipes 60 forming a "+" or four-way intersection as viewed by the cameras 58 on the dispense head 20, the operator can activate both actuators 54 and push the diverters 52 into the lining material, thereby blocking the lining material from entering the intersecting pipes 60. Once the dispense head 20 is past the intersecting pipes 60, the operator can activate the actuators 54 and pull or retract the diverters 52 and continue to line the full pipe 12 with the lining 61 as illustrated in FIG. 5. It should be appreciated that the amount of time the piston of the actuators 54 stay activated is controlled by the rate of the movement of the slip molding apparatus 10.

The present invention further provides a method of using the slip molding apparatus 10 for lining the pipe 12. The method generally includes the steps of disposing the slip molding apparatus 10 including the dispense head 20 and the slip mold 38 within an interior of the pipe 12. The method includes the steps of engaging the interior surface 14 of the pipe 12 with the dispense head 20 and dispensing the lining material. The method includes the steps of supplying the lining material to and through the dispense head 20 with a supply or chemical hose 36 attached to the dispense head 20. The method includes the steps of pulling the slip mold 38 by the dispense head 20. The method includes the steps of viewing the interior surface 14 of the pipe 12 with at least one camera 58 disposed on the dispense head 20. The method includes the steps of guiding the lining material dispensed by the dispense head 20 about the slip mold 38 with the guide 46 connected to the dispense head 20 and the slip mold 38. The method includes the steps of communicating with the actuator 54 with the remote controller 59 and actuating the actuator 54 by an operator with the remote controller 59. The method includes the steps of blocking a flow of lining material dispensed by the dispense head 20 with a movable diverter 52 on the slip mold 38 cooperating with the guide 46. The method includes the steps of actuating and moving the diverter 52 between a retracted position and an extended position with the actuator 54 on the slip mold 38. The method includes the steps of heating the lining material with the heater 56 connected to the slip mold 38 to cure the lining material. It should be appreciated that the slip molding apparatus 10 may be used by various other methods, not specifically described herein.

Accordingly, the slip molding apparatus 10 of the present invention has the ability to prevent flow into intersecting pipes 60 so that they are not blocked by the lining materials. The slip molding apparatus 10 of the present invention allows for precise flow rate calculations of the rehabilitated pipe 12. The slip molding apparatus 10 of the present invention has the ability to provide a variety of pipeline linings such, but not limited to, concrete, cement, polyurethane, epoxy, etc. The slip molding apparatus 10 of the present invention has the ability to add reinforcing materials to the lining such as, but not limited to, fiberglass windings or pieces, glass microspheres, mesh, wire, etc. The slip molding apparatus 10 of the present invention has the ability to apply leak detection wires during application. The slip molding apparatus 10 of the present invention has full contact to the inner surface of the pipe 12 that is being rehabilitated.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A slip molding apparatus for lining a pipe comprising:
    a dispense head adapted to engage an interior surface of a pipe and to dispense a lining material;
    a slip mold pulled by said dispense head and having a leading end and a trailing end, wherein the trailing end has a greater diameter than a diameter of the leading end, the slip mold including a body having a generally cylindrical shape;
    at least one camera disposed on said dispense head to provide a view of the interior surface of the pipe;
    a guide connected to said dispense head and said slip mold for guiding the lining material dispensed by said dispense head about said slip mold, the guide disposed between said dispense head and said slip mold; and
    at least one diverter plate on said slip mold cooperating with said guide to divert a flow of lining material dispensed by said dispense head about said slip mold,
    wherein the at least one diverter plate is operatively connected to an actuator on said slip mold to actuate and move the at least one diverter plate between a retracted position and an extended position, and
    in the extended position, the actuator is configured to push the at least one diverter plate into contact with the guide to block flow of the lining material about a side of the body.

2. The slip molding apparatus as set forth in claim 1 including a supply hose attached to said dispense head for supplying the lining material to and through said dispense head.

3. The slip molding apparatus as set forth in claim 1 wherein said at least one camera comprises a camera disposed on a leading end of said dispense head.

4. The slip molding apparatus as set forth in claim 3 wherein said at least one camera comprises a plurality of cameras disposed on a leading end of said dispense head.

5. The slip molding apparatus as set forth in claim 1 including at least one camera disposed on a trailing end of said slip mold.

6. The slip molding apparatus as set forth in claim 1 including a plurality of rollers rotatably connected to said dispense head to contact the interior surface of the pipe.

7. The slip molding apparatus as set forth in claim 1 including a heater connected to said slip mold to heat the lining material.

8. The slip molding apparatus as set forth in claim 7 wherein said heater comprises a heating element disposed inside said slip mold.

9. The slip molding apparatus as set forth in claim 1 including a remote controller communicating with said actuator for actuating said actuator by an operator.

10. The slip molding apparatus as set forth in claim 1 wherein said guide has a conical shape.

11. A method of using a slip molding apparatus as set forth in claim 1 to line a pipe with a lining material, said method comprising the steps of:
    disposing the slip molding apparatus within an interior of a pipe;
    engaging the interior surface of the pipe with the dispense head and dispensing the lining material;
    pulling the slip mold by the dispense head;
    viewing the interior surface of the pipe with the at least one camera disposed on the dispense head;
    guiding the lining material dispensed by the dispense head about the slip mold with the guide connected to the dispense head and the slip mold; and
    diverting a flow of lining material dispensed by the dispense head about the slip mold with the at least one diverter plate on the slip mold cooperating with the guide.

12. The method as set forth in claim 11 including the steps of communicating with the actuator with a remote controller and actuating the actuator by an operator with the remote controller.

13. The method as set forth in claim 11 including the steps of heating the lining material with a heater connected to the slip mold.

14. The method as set forth in claim 11 including the steps of contacting the interior surface of the pipe with a plurality of rollers rotatably connected to the dispense head.

15. The method as set forth in claim 11 including the steps of pulling the dispense head through the pipe and forming a lining on the interior surface of the pipe by the slip mold moving through the lining material dispensed.

16. The method as set forth in claim 11 including the steps of supplying the lining material to and through the dispense head with a supply hose attached to the dispense head.

* * * * *